(12) United States Patent
Chiang et al.

(10) Patent No.: US 10,312,035 B2
(45) Date of Patent: Jun. 4, 2019

(54) LUMINOUS KEYBOARD

(71) Applicant: Primax Electronics Ltd., Taipei (TW)

(72) Inventors: Ying-Te Chiang, Taipei (TW);
Lei-Lung Tsai, Taipei (TW); Kun-I Yuan, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 1 day.

(21) Appl. No.: 15/879,692

(22) Filed: Jan. 25, 2018

(65) Prior Publication Data
US 2019/0115171 A1 Apr. 18, 2019

(30) Foreign Application Priority Data
Oct. 13, 2017 (TW) .............................. 106135141 A

(51) Int. Cl.
*H01H 13/83* (2006.01)
*H01H 9/18* (2006.01)
*H01H 13/702* (2006.01)
*F21V 8/00* (2006.01)
*H01H 3/12* (2006.01)

(52) U.S. Cl.
CPC ........... *H01H 13/83* (2013.01); *G02B 6/0011* (2013.01); *H01H 9/182* (2013.01); *H01H 13/702* (2013.01); *H01H 3/125* (2013.01); *H01H 2009/183* (2013.01); *H01H 2219/018* (2013.01)

(58) Field of Classification Search
CPC ...... H01H 13/83; H01H 9/182; H01H 13/702; H01H 13/125; H01H 2009/183; G02B 6/0011

USPC .......................................................... 200/314
See application file for complete search history.

(56) References Cited

U.S. PATENT DOCUMENTS

| 8,168,905 | B2 * | 5/2012 | Yang | ...................... H01H 13/83 200/314 |
| 8,545,080 | B2 * | 10/2013 | Ohrui | .................... G02B 6/0043 362/23.04 |
| 8,770,772 | B1 * | 7/2014 | Zhang | ..................... H01H 13/83 200/5 A |
| 8,987,617 | B2 * | 3/2015 | Wang | ...................... H01H 13/83 200/5 A |
| 9,040,856 | B2 * | 5/2015 | Chen | ...................... H01H 13/83 200/310 |
| 9,214,301 | B2 * | 12/2015 | Chen | ...................... H01H 13/83 |

* cited by examiner

*Primary Examiner* — Kyung S Lee
(74) *Attorney, Agent, or Firm* — Kirton McConkie; Evan R. Witt

(57) ABSTRACT

The present invention relates to a luminous keyboard, including a key, a support plate, a switch circuit board, a light guide plate, and a direct-type light emitting element capable of generating a beam. The support plate is located below the key, and the switch circuit board is disposed on the support plate. The light guide plate is located below the support plate and includes a concave structure, and the concave structure forms a reflective surface inside the light guide plate. The direct-type light emitting element is located below the concave structure. When the beam enters the light guide plate, the beam is reflected by the reflective surface to be fully reflected in the light guide plate, and the light guide plate guides the beam to be projected to a peripheral area of a key.

10 Claims, 6 Drawing Sheets

LUMINOUS KEYBOARD

FIELD OF THE INVENTION

The present invention relates to a keyboard, and particularly, to a luminous keyboard capable of producing a light emitting effect.

BACKGROUND OF THE INVENTION

Common computer-peripheral input devices include mice, keyboards, trackballs, and the like, where keyboards can be used to directly enter words and characters into a computer, and therefore, draw great attention from users and input device manufacturers.

Referring to FIG. 1, FIG. 1 is a schematic structural diagram of the appearance of a conventional keyboard. A plurality of keys 10 is exposed on a surface of a keyboard 1, and the keys 10 are classified as generic keys 101, number keys 102, function keys 103, and the like. The keys are provided for a user to touch and press with fingers, to generate a corresponding signal input to the computer, to enable the computer to implement a function of the touched and pressed key. For example, the generic keys 101 are used for inputting symbols such as English letters, the number keys 102 are used for inputting numbers, and the function keys 103 are used for providing various functions such as F1 to F12. The conventional keyboard 1 is a keyboard for a notebook computer.

With the evolution of technologies, keyboard manufacturers are devoted to researching and developing various keyboards having particular functions, such as a luminous keyboard, to meet various requirements of different users. An internal structure of a conventional luminous keyboard is described below. Referring to FIG. 2, FIG. 2 is a structural sectional view of a conventional luminous keyboard. A conventional luminous keyboard 2 includes a plurality of keys 20, a membrane switch circuit 21, a light guide plate 22, a light emitting module 23, a support plate 24, and a reflector plate 25. The key 20 includes a key cap 201, a scissors-type connecting element 202, and an elastic element 203. In the conventional luminous keyboard 2, an arrangement sequence of the foregoing components from top to bottom are the key cap 201, the scissors-type connecting element 202, the elastic element 203, the membrane switch circuit 21, the support plate 24, the light guide plate 22, and the reflector plate 25, and the support plate 24 located between the membrane switch circuit 21 and the light guide plate 22 can bear the key cap 201, the scissors-type connecting element 202, the elastic element 203, and the membrane switch circuit 21 thereon.

In the key 20, the key cap 201 is exposed out of the conventional keyboard 2 and can be touched and pressed by a user, the scissors-type connecting element 202 is used for connecting the key cap 201 and the support plate 24, and the elastic element 203 penetrates through the scissors-type connecting element 202 and is in contact with the key cap 201 and the membrane switch circuit 21 separately. The membrane switch circuit 21 includes an upper circuit board 211, an isolation layer 212, and a lower circuit board 213. The upper circuit board 211 has a plurality of upper conductive parts 2111. The isolation layer 212 is located below the upper circuit board 211 and has a plurality of isolation layer holes 2121 corresponding to the plurality of upper conductive parts 2111. The lower circuit board 213 is located below the isolation layer 212 and has a plurality of lower conductive parts 2131 corresponding to the plurality of upper conductive parts 2111, so that the plurality of lower conductive parts 2131 and the plurality of upper conductive parts 2111 form a plurality of key switches 214. The upper circuit board 211, the isolation layer 212, and the lower circuit board 213 are all made of a transparent material, and the transparent material is made from polycarbonate (PC) or polyethylene (PE), to have a light transmission effect.

The light emitting module 23 includes a power supply circuit board 231 and a plurality of light emitting elements 232 (only two are shown). The power supply circuit board 231 is located below the membrane switch circuit 21 and is used for supplying power to the plurality of light emitting elements 232. The plurality of light emitting elements 232 are disposed on the power supply circuit board 231 and extend into a plurality of reflector holes 251 of the reflector plate 25 and a plurality of light guide plate holes 221 of the light guide plate 22. When the plurality of light emitting elements 232 is powered on, the plurality of light emitting elements 232 generates a plurality of beams B, and the plurality of beams B is projected to the light guide plate 22. The light emitting elements 232 are edge-type light-emitting diodes (LEDs). A function of the light guide plate 22 is guiding a plurality of beams B to be projected to the key cap 201. The reflector plate 25 is disposed below the light guide plate 22 and can reflect the plurality of beams B to project the plurality of beams B upward, so as to avoid waste of the beams B. Two side edges 252 of the reflector plate 25 are bent upward and wrap a plurality of side edges 222 of the light guide plate 22, to avoid a light leakage phenomenon on the side edges 222 of the light guide plate 22.

In the conventional luminous keyboard 2, each key cap 201 has an out-light area 2011, and the out-light area 2011 is a position where a letter or a symbol is located. The position of the out-light area 2011 corresponds to the position where a light guide dot 223 is located on the light guide plate 22, so that the beam penetrates through the light guide dot 223 and is guided upward to the out-light area 2011. When the beam B transmitted and guided in the light guide plate 22 is projected to the light guide dot 223, the light guide dot 223 can guide the beam B to be projected upward. The beam B projected upward can sequentially penetrate through support plate holes 241 of the support plate 24 and the membrane switch circuit 21, and further penetrate through the out-light area 2011 of the key cap 201, so that a letter or a symbol on the key cap 201 can transmit light and have a light emitting effect.

Recently, users expect that a light emitting effect of each key in a luminous keyboard can be controlled. For example, a key A is controlled to emit light, but a key B is controlled not to emit light. However, the foregoing conventional luminous keyboard 2 cannot meet the foregoing requirement. To satisfy requirements of users, a direct-type luminous keyboard needs to be used. In the direct-type luminous keyboard, a single direct-type LED is disposed below a key cap of each key, so that a light emitting situation of each direct-type LED can be controlled separately to satisfy the requirements of the users. A beam generated by the direct-type LED is directly projected upward to the corresponding key cap. Therefore, a light projection effect of the direct-type luminous keyboard is excessively concentrated, and a light evenness effect cannot be achieved.

Therefore, a luminous keyboard having a function of separately controlling a light emitting situation of a key and having an even light-emitting effect is needed.

SUMMARY OF THE INVENTION

An objective of the present invention is to provide a luminous keyboard having a function of separately controlling a light emitting situation of a key and having an even light-emitting effect.

In a preferred embodiment, the present invention provides a luminous keyboard, including a key, a support plate, a switch circuit board, a light guide plate, and a direct-type light emitting element. The key is exposed out of the luminous keyboard. The support plate is located below the key and connected to the key. The switch circuit board is disposed on the support plate and used for outputting a key signal when triggered by the key. The light guide plate is located below the support plate, where the light guide plate includes a concave structure, and the concave structure forms a reflective surface. The direct-type light emitting element is disposed below the light guide plate and used for generating a beam and project the beam into the light guide plate, where the beam is reflected by the reflective surface inside the light guide plate to be fully reflected in the light guide plate, and is guided by the light guide plate to be projected to a peripheral area of the key.

In a preferred embodiment, a depth of the concave structure of the light guide plate is larger than 0.1*(a thickness of the light guide plate).

In short, the luminous keyboard of the present invention uses a direct-type light emitting element, and the direct-type light emitting element has a one-to-one correspondence with a key. Therefore, the luminous keyboard of the present invention can separately control a light emitting effect of each key. In addition, the light guide plate is provided with a concave structure, to form a reflective surface inside the light guide plate, and the reflective surface is located above the direct-type light emitting element. When the direct-type light emitting element generates a beam, the beam enters the light guide plate to be reflected by the reflective surface, so as to be fully reflected inside the light guide plate. Subsequently, the light guide plate guides the beam to penetrate through the support plate and the switch circuit board to be projected to a peripheral area of the key. Therefore, the luminous keyboard of the present invention can produce an even light-emitting effect.

DETAILED DESCRIPTION OF THE PREFERRED EMBODIMENT

Figure 1:
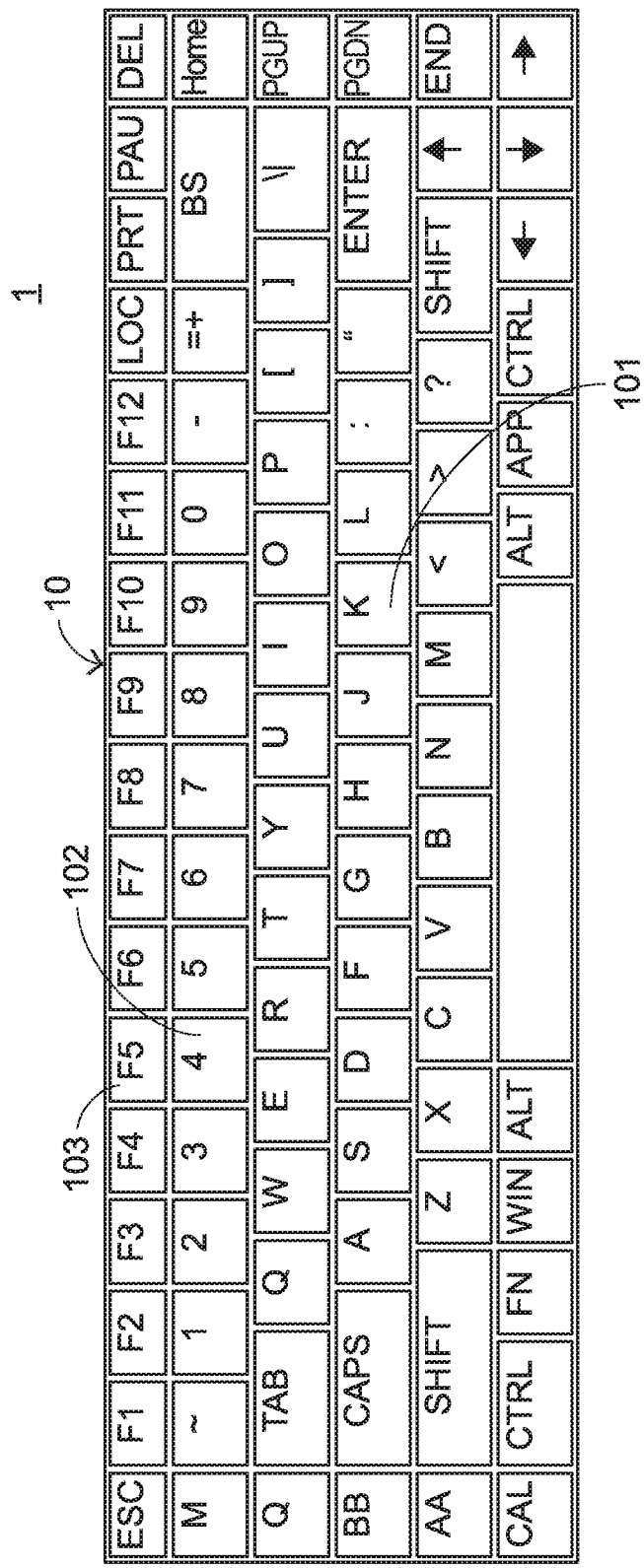
FIG. 1 is a schematic structural diagram of the appearance of a conventional keyboard.
Figure 2:
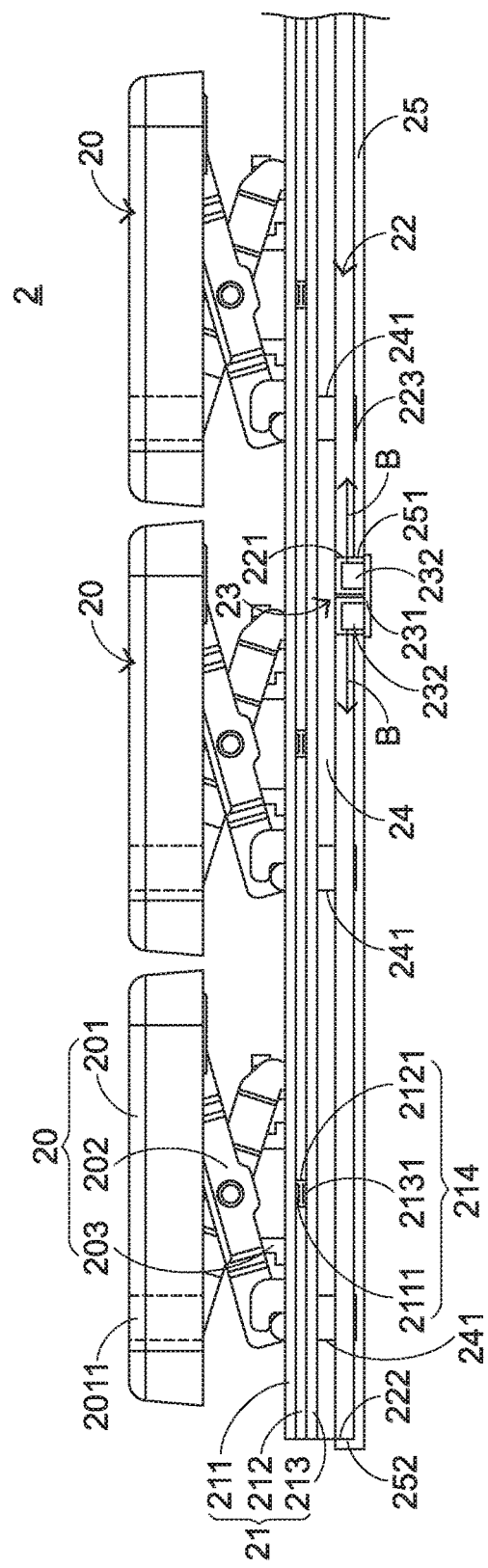
FIG. 2 is a structural sectional view of a conventional luminous keyboard.
Figure 3:
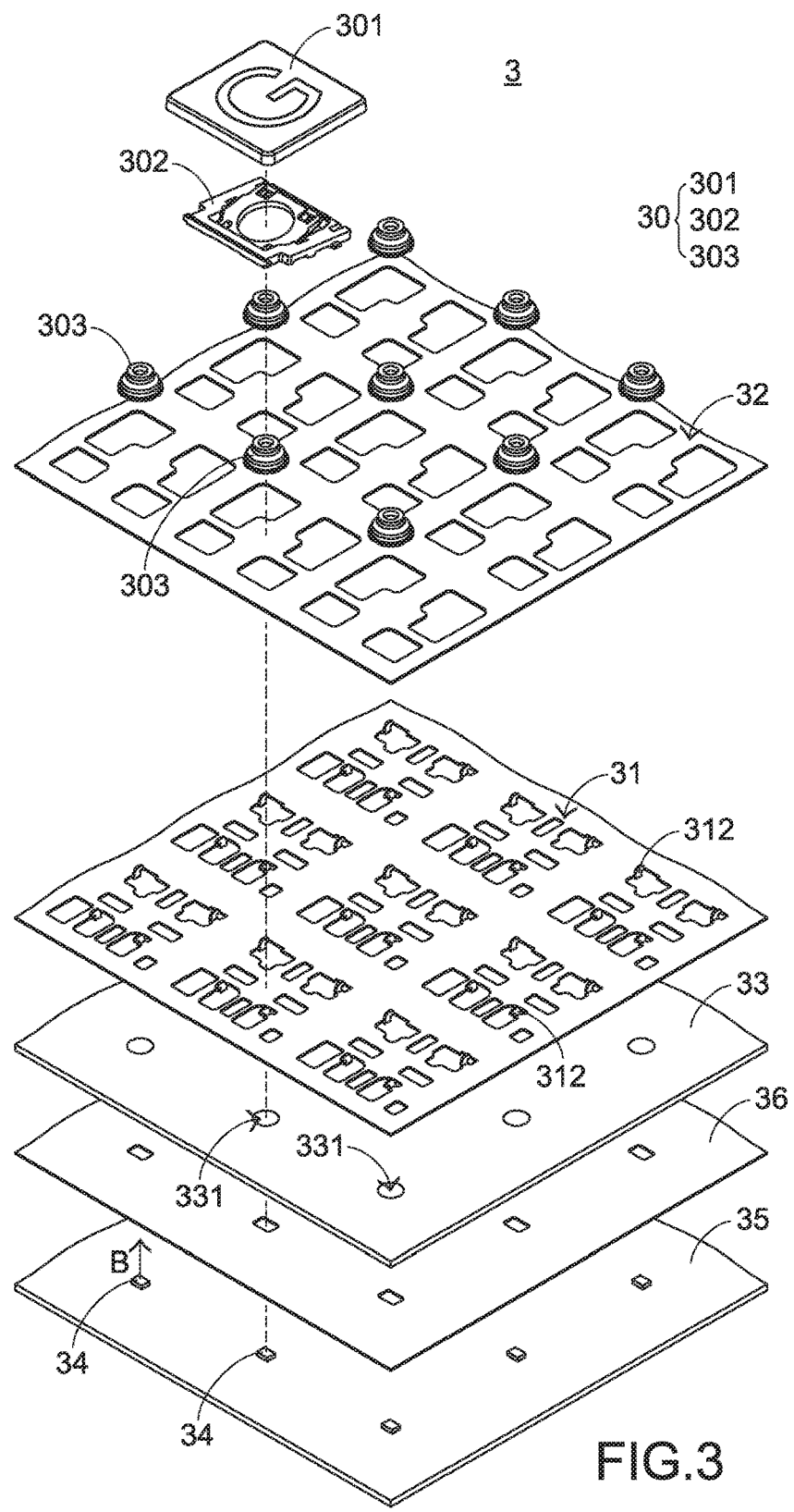
FIG. 3 is a schematic exploded view of a local structure of a luminous keyboard of the present invention in a preferred embodiment.
Figure 4:
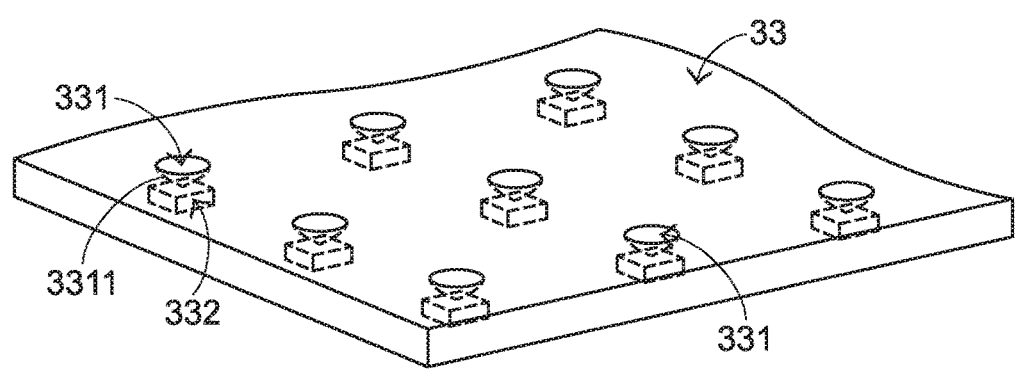
FIG. 4 is a schematic structural diagram of a light guide plate of a luminous keyboard of the present invention in a preferred embodiment.

In view of the problems in the conventional technology, the present invention provides a keyboard capable of resolving the problems in the conventional technology. First, a structure of a luminous keyboard of the present invention is described. Referring to FIG. 3 and FIG. 4 together, FIG. 3 is a schematic exploded view of a local structure of a luminous keyboard of the present invention in a preferred embodiment, and FIG. 4 is a schematic structural diagram of a light guide plate of a luminous keyboard of the present invention in a preferred embodiment. A luminous keyboard 3 of the present invention includes a plurality of keys 30 (only one is shown), a support plate 31, a switch circuit board 32, a light guide plate 33, a plurality of direct-type light emitting elements 34, a power supply circuit board 35, and a reflecting element 36, where each direct-type light emitting element 34 corresponds to one key 30. The plurality of keys 30 is exposed out of the luminous keyboard 3. The support plate 31 is located below the plurality of keys and is connected to the plurality of keys 30. The support plate 31 includes a plurality of holes 311 and a plurality of hooks 312 that correspond to the keys 30. The switch circuit board 32 is disposed on the support plate 31, and a function thereof is that the switch circuit board 32 can be triggered by the key 30 to output a corresponding key signal. The light guide plate 33 is located below the support plate 31, and the light guide plate 33 includes a plurality of concave structures 331 and a plurality of accommodation grooves 332 that correspond to the plurality of direct-type light emitting elements 34. The concave structure 331 can form a reflective surface 3311 inside the light guide plate 33, and the reflective surface 3311 is located above a corresponding direct-type light emitting element 34. The accommodation groove 332 is provided on a lower surface of the light guide plate 33 and can be used for accommodating a corresponding direct-type light emitting element 34 inside.

The direct-type light emitting element 34 is disposed below a corresponding key 30 and extends into the corresponding accommodation groove 332, and a function thereof is generating a beam B. The power supply circuit board 35 is located below the light guide plate 33, can bear the plurality of direct-type light emitting elements 34, and is separately electrically connected to the plurality of direct-type light emitting elements 34. The reflective surface 3311 corresponds to a direct-type light emitting element 34 and is located between the corresponding direct-type light emitting element 34 and key 30, and its function is reflecting the beam B, to prevent the beam B from being directly projected to the key 30. The reflecting element 36 is located between the light guide plate 33 and the power supply circuit board 35, and a function thereof is also reflecting the beam B. In this preferred embodiment, the direct-type light emitting element 34 is a direct-type LED, and the power supply circuit board 35 is a printed circuit board (PCB) or a flexible printed circuit (FPC).

It should be specially noted that the reflecting element 36 may be a reflector plate or reflective ink. When the reflecting element 36 is reflective ink, the reflective ink may be printed or coated onto the lower surface of the light guide plate 33 or an upper surface of the power supply circuit board 35, and when the reflecting element 36 is a reflector plate, a reflector hole needs to be provided on the reflector plate for the direct-type light emitting element 34 to penetrate through to extend into the accommodation groove 332.

In FIG. 3, each key 30 includes a key cap 301, a connecting element 302, and a trigger element 303. The key cap 301 is located above the support plate 31 and is exposed out of the luminous keyboard 3. A peripheral area A is defined as an outer edge area of the key cap 301. For example, FIG. 3 shows a letter G, and the peripheral area A is defined as a peripheral area of the letter G. The connecting element 302 is located between the corresponding key cap 301 and the support plate 31, can connect the key cap 301 to the support plate 31, and enables the key cap 301 to vertically move relative to the support plate 31. The connecting element 302 may be separately connected to the key cap 301 and the plurality of hooks 312 of the support plate 31. The trigger element 303 is located between the corresponding key cap 301 and the switch circuit board 32, and can be deformed when pressed against by the key cap 301, to trigger the switch circuit board 32, or can be recovered from a deformed state because of elasticity of the trigger element 303 and meanwhile, provide an upward elastic force to the key cap 301, to return the key cap 301 to an original position. It could be learned from FIG. 3 that the plurality of holes 311 of the support plate 31 is located at positions surrounding the trigger element 303. That is, the plurality of holes 311 corresponds to the peripheral area A of the key cap 301. In this preferred embodiment, the connecting element 302 is a scissors-type connecting element, and the trigger element 303 is an elastic body.

It should be specially noted that the plurality of keys in this preferred embodiment controls, by means of actuation of the plurality of connecting elements 302, the plurality of key caps 301 to vertically move and meanwhile, controls the plurality of elastic elements 303 to touch and press the switch circuit board 32. This is merely an example, and the present invention is not limited thereto. In another preferred embodiment, the plurality of keys may perform actuation by using non-scissors-type connecting elements. For example, a desktop computer uses a volcanic vent-shaped connection structure. In addition, the key caps may even be controlled magnetically to move vertically.

Figure 5:
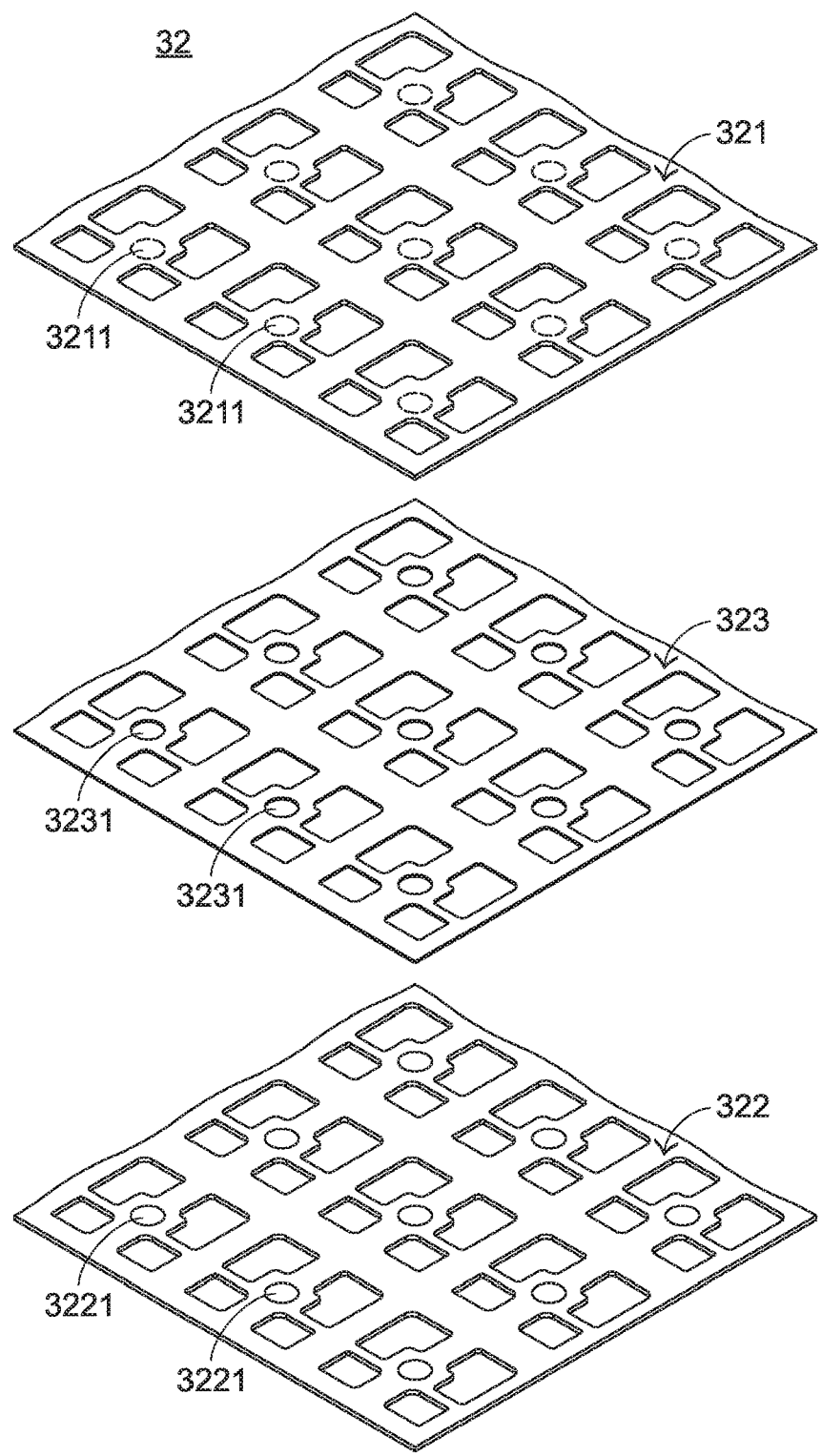
FIG. 5 is a schematic exploded view of a structure of a switch circuit board of the present invention in a preferred embodiment.

Referring to FIG. 3 and FIG. 5 together, FIG. 5 is a schematic exploded view of a structure of a switch circuit board of the present invention in a preferred embodiment. The switch circuit board 32 includes an upper circuit board 321, a lower circuit board 322, and an isolation layer 323. The upper circuit board 321 is in contact with the trigger element 303 and includes an upper conductive part 3211, and the upper conductive part 3211 is disposed on a lower surface of the upper circuit board 321. The lower circuit board 322 is located below the upper circuit board 321 and includes a lower conductive part 3221, and the lower conductive part 3221 is disposed on an upper surface of the lower circuit board 322. To make the figure clearly visible, a conducting line electrically connected to the upper conductive part 3211 and the lower conductive part 3221 is not shown in FIG. 5. The isolation layer 323 is located between the upper circuit board 321 and the lower circuit board 322 and includes isolation layer holes 3231 corresponding to the key caps 301. A function of the isolation layer 323 is isolating the upper conductive part 3211 and the lower conductive part 3221. The upper conductive part 3211, the isolation layer hole 3231, and the lower conductive part 3221 together form a key switch, and each key switch corresponds to one key 30. When the trigger element 303 triggers the upper circuit board 321, the upper conductive part 3211 extends into the isolation layer hole 3231 to come into contact with the lower conductive part 3221, so that the switch circuit board 32 is on and outputs a corresponding key signal.

In this preferred embodiment, the upper conductive part 3211 and the lower conductive part 3221 are both circular block-shaped conductive parts. This is merely used for illustration, and the present invention is not limited thereto. Alternatively, the upper conductive part and the lower conductive part may be designed as block-shaped conductive parts of various shapes such as rectangular, triangular, or diamond block-shaped conductive parts. In another preferred embodiment, the upper conductive part and the lower conductive part may alternatively be designed to be transparent in the middle, and may be, for example, rectangular, triangular, or diamond block-shaped conductive parts, and the block-shaped conductive parts are provided with a hollow area capable of transmitting light at the center, so that when a beam penetrates through the block-shaped conductive parts, the beam can penetrate through the block-shaped conductive parts through the hollow area.

Figure 6:
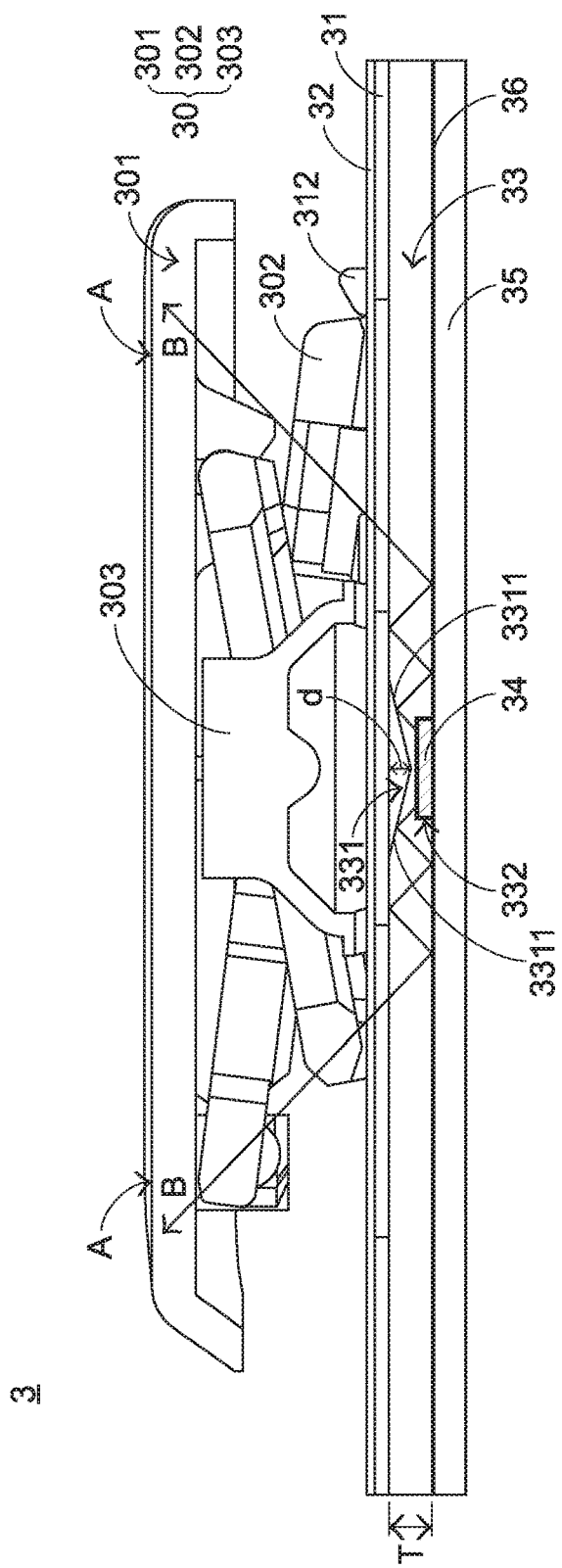
FIG. 6 is a side view of a local structure of a luminous keyboard of the present invention in a preferred embodiment.

Referring to FIG. 3, FIG. 4, and FIG. 6 together, FIG. 6 is a side view of a local structure of a luminous keyboard of the present invention in a preferred embodiment. FIG. 6 shows a structure that components are all assembled, and to clearly show a projection path of the beam B. FIG. 6 does not show a structure of the connecting element 302. In addition, it could be learned from FIG. 3, FIG. 4, and FIG. 6 that the out-light surface 341 of the direct-type light emitting element 34 is directed toward the key cap 301, so that the beam B generated by the direct-type light emitting element 34 is projected upward. When the direct-type light emitting element 34 is driven to generate the beam B, the beam B is projected upward, enters into the light guide plate 33, and is reflected by the reflective surface 3311 in the light guide plate 33. A direction of the beam B is changed, and the beam B can be fully reflected inside the light guide plate 33. Subsequently, the beam B can be guided by the light guide plate 33 to penetrate through the plurality of holes 311 of the support plate 31. Due to the structure of the light guide plate 33, the beam B can be projected to a position relatively distant from the upper conductive part 3211 (or the lower conductive part 3221) in the switch circuit board 32, so that the beam B can penetrate through the switch circuit board 32 to be projected to the peripheral area A of the key cap 301.

In a process that the beam B is guided by the light guide plate 33, a part of the beam B departs from the light guide plate 33, but the reflecting element 36 located below the light guide plate 33 can reflect the beam B, so that the beam B enters into the light guide plate 33 again. By means of the structure of the luminous keyboard 3 of the present invention, the beam B can be reflected, and by means of the light guide plate 33, the beam B is projected to the peripheral area A of the key cap 301, so that the key cap 301 can produce an even light-emitting effect, to resolve the problem that light is excessively concentrated.

There are three points that need to be specially noted. First, in the process that the beam B is guided by the light guide plate 33, the beam B can be fully reflected in the light guide plate 33, but it is not limited that the reflecting element 36 needs to be disposed therein. In other words, for the luminous keyboard of the present invention, whether to dispose the reflecting element therein can be chosen according to requirements. Second, in the light guide plate 33, the concave structure 331 is of various concave shapes such as a concave cone and a concave arc-shaped groove. The light guide plate 33 is designed as follows: a depth d of the concave structure 331 is larger than 0.1*(a thickness T of the light guide plate 33). This depth d is designed by repeated experiments, so that a reflective surface having a better reflection effect can be obtained.

Third, it is not limited in the present invention that the accommodation groove needs to be disposed on the lower surface of the light guide plate. Alternatively, the direct-type light emitting element may be directly disposed below the light guide plate, as long as it ensures that a beam generated by the direct-type light emitting element can be projected into the light guide plate. However, the design of providing the accommodation groove on the lower surface of the light guide plate can reduce the thickness of the luminous keyboard and promote the development of thin luminous keyboards.

In view of the above, the luminous keyboard of the present invention uses a direct-type light emitting element, and the direct-type light emitting element has a one-to-one correspondence with a key. Therefore, the luminous keyboard of the present invention can separately control a light emitting effect of each key. In addition, the light guide plate is provided with a concave structure, to form a reflective surface inside the light guide plate, and the reflective surface is located above the direct-type light emitting element. When the direct-type light emitting element generates a beam, the beam enters the light guide plate to be reflected by the reflective surface, so as to be fully reflected inside the light guide plate. Subsequently, the light guide plate guides the beam to penetrate through the support plate and the switch circuit board to be projected to a peripheral area of the key. Therefore, the luminous keyboard of the present invention can produce an even light-emitting effect.

The above are merely preferred embodiments of the present invention and are not intended to limit the claims of the present invention. Therefore, other equivalent changes or modifications made without departing from the spirit disclosed by the present invention should all be included in the claims of the present application.

What is claimed is:

1. A luminous keyboard, comprising:
a key, exposed out of the luminous keyboard;
a support plate, located below the key and connected to the key;
a switch circuit board, disposed on the support plate and used for outputting a key signal when triggered by the key;
a light guide plate, located below the support plate, wherein the light guide plate comprises a concave structure, and the concave structure forms a reflective surface;
a direct-type light emitting element, disposed below the light guide plate and used for generating a beam and project the beam into the light guide plate, wherein the beam is reflected by the reflective surface inside the light guide plate to be fully reflected in the light guide plate, and is guided by the light guide plate to be projected to a peripheral area of the key.

2. The luminous keyboard according to claim 1, further comprising a power supply circuit board, located below the light guide plate, used for bearing the direct-type light emitting element, and electrically connected to the direct-type light emitting element, wherein an out-light surface of the direct-type light emitting element is directed toward the key.

3. The luminous keyboard according to claim 2, wherein the power supply circuit board is a printed circuit board (PCB) or a flexible printed circuit (FPC).

4. The luminous keyboard according to claim 1, further comprising a reflecting element, located between the light guide plate and the power supply circuit board and used for reflecting the beam that departs from the light guide plate, to make the beam enter into the light guide plate again.

5. The luminous keyboard according to claim 4, wherein the reflecting element is disposed on an upper surface of the power supply circuit board or a lower surface of the light guide plate in a printing or coating manner.

6. The luminous keyboard according to claim 1, wherein the key comprises:
a key cap, located above the support plate and exposed out of the luminous keyboard, wherein the peripheral area is disposed on the key cap;
a connecting element, located between the key cap and the support plate and used for connecting the key cap to the support plate and enable the key cap to vertically move relative to the support plate; and
a trigger element, located between the key cap and the switch circuit board and used for triggering the switch circuit board when pressed against by the key cap.

7. The luminous keyboard according to claim 6, wherein the switch circuit board comprises:
an upper circuit board, in contact with the trigger element, wherein the upper circuit board comprises an upper conductive part;
a lower circuit board, located below the upper circuit board, wherein the lower circuit board comprises a lower conductive part; and
an isolation layer, located between the upper circuit board and the lower circuit board and used for isolating the upper conductive part and the lower conductive part, the isolation layer comprising an isolation layer hole, wherein when the trigger element triggers the upper circuit board, the upper conductive part extends into the isolation layer hole to come into contact with the lower conductive part, to enable the switch circuit board to output the key signal.

8. The luminous keyboard according to claim 1, wherein the support plate comprises at least one hole, used for being penetrated through by the beam guided by the light guide plate, so that the beam is projected to the peripheral area of the key.

9. The luminous keyboard according to claim 1, wherein a depth of the concave structure of the light guide plate is larger than 0.1*(a thickness of the light guide plate).

10. The luminous keyboard according to claim 1, wherein the light guide plate further comprises an accommodation groove, provided on a lower surface of the light guide plate and used for accommodating the direct-type light emitting element inside.

* * * * *